3,559,039
Patented Jan. 26, 1971

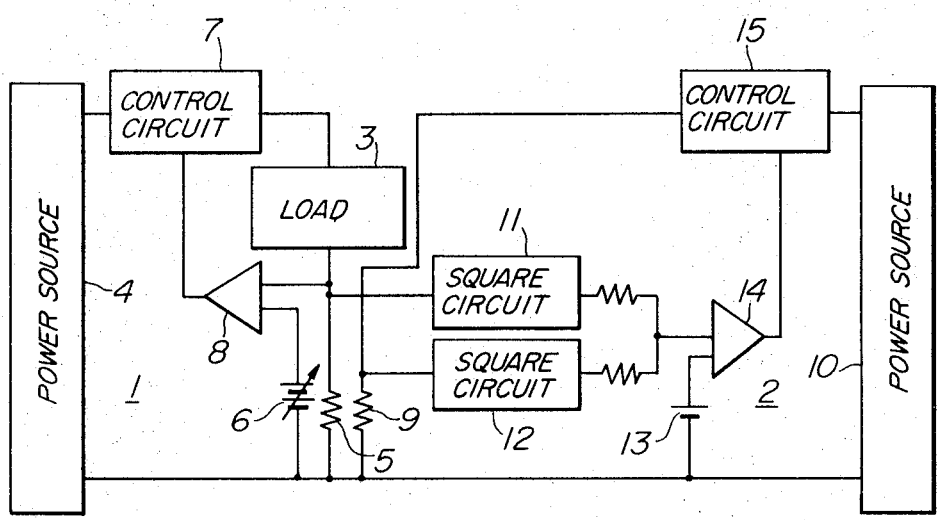

3,559,039
REGULATED POWER SUPPLY WITH THERMAL COMPENSATION
Koji Nishiwaki, Katsuta-shi, and Yukichi Ueno, Mito-shi, Japan, assignors to Hitachi, Ltd., Chiyoda-ku, Tokyo-to, Japan
Filed Oct. 23, 1968, Ser. No. 769,925
Claims priority, application Japan, Oct. 25, 1967, 42/68,296
Int. Cl. G05f 1/46
U.S. Cl. 323—1                        7 Claims

ABSTRACT OF THE DISCLOSURE

A regulated power supply of multiple ratings, which includes a resistor connected in series to the load for detecting the load current as a voltage drop across said resistor and a control circuit for regulating the load current depending on the difference between said voltage drop and a reference voltage, characterized in that another resistor is thermally coupled with said voltage detecting resistor and said another resistor is energized so that the temperature or the total power consumption in said two resistors is maintained at a constant value, thereby to eliminate a possible error due to the change in value of said current detecting resistor caused by the substantial variation of the load current when the power supply is switched to operate at another rating.

BACKGROUND OF THE INVENTION (1) Field of the invention

This invention relates to a regulated power supply which includes an electrical control device to prevent a resistor in an electrical circuit from changing its resistance value due to a variation of its temperature which may be caused either by the variation of current flowing therethrough or by the variation of the ambient temperature, and more particularly to such an electrical control device that is suitable for compensation of variations in the output of a regulated power supply due to the change in the value of a detecting resistor. Such a regulated power supply as used for exciting the lens coil of an electronic microscope requires a highly stable power that can be selectively changed in a plurality of ranges of greatly different magnitudes.

(2) Description of the prior art

A regulated power supply which can maintain a highly stable operation is often required in some electronic devices as in the case of the power supply for exciting the lens coil of an electronic microscope. Such a power supply may include a resistor connected in series to the load for detecting the load current as a voltage drop across said resistor, and a current regulator for controlling the load current so as to minimize the difference between said detected voltage drop and a reference voltage.

On the other hand, the load current or output current of a regulated power supply is often required to be changed in a plurality of ranges of greatly different magnitudes, as is seen in an electronic microscope when the lens current is changed in order to vary the magnifying power of said microscope. Such a change of the output current can be attained by changing the above-mentioned reference voltage as required.

However, said change of the rated output current causes a change in the electric power consumed in said voltage detecting resistor, which brings about a change in the temperature of said resistor, which in turn causes a change in the value of said resistor. Therefore, the drift of the load current due to the change of the temperature of said resistor is unavoidable as a result of the change in the power consumption in said resistor.

In order to minimize such a drift of the load current, various measures have been taken. One of such measures is to prevent a rise in temperature in said resistor even with a large current by facilitating heat dissipation from said resistor. Another measure is to maintain the ambient temperature of said resistor at a constant value by a conventional temperature control system. However, neither of the above-mentioned measures has been satisfactory to prevent said drift of the load current resulting from the change in power consumption in said resistor.

SUMMARY OF THE INVENTION

The main object of the invention is to provide a regulated power supply which includes an electrical control device to prevent the drift in the value of a resistor in an electrical circuit due to the change in the temperature thereof which is caused by the variation of the power consumption in said resistor even when current flowing therethrough is changed in a wide range.

Another object of this invention is to provide a regulated power supply which is free from the drift of the load current due to the change in the temperature of the current detecting resistor caused by the variation of the power consumption in said resistor even when said power supply is switched to operate at another rating.

According to one embodiment of the invention, a regulated power supply of this invention which includes a power source for supplying an electric current to a load, a first electric element for detecting said current to the load, and means for controlling said load current in response to the detection of said first electric element so as to maintain said load current at a substantially constant value, is characterized in that said regulated power supply further includes a second electric element which is thermally coupled closely with said first electric element, an auxiliary power source for supplying an electric current to said second electric element, and means for controlling said current to said second electric element so that the sum of the power consumed in said first and second electric elements is substantially constant.

Other objects and features of this invention will be clarified from the following description which is made with reference to the attached drawing.

BRIEF DESCRIPTION OF THE DRAWING

The drawing shows a block diagram of a regulated power supply embodying this invention.

DESCRIPTION OF THE PREFERRED EMBODIMENT

Referring to the figure, there is shown a regulated power supply which comprises a main regulated power supply system 1 and an auxiliary power supply system 2, a load 3 being connected to said main power supply system. The main regulated power supply system 1 comprises an unregulated power source 4 for supplying an electric current to the load 3, a resistor 5 for detecting the current to said load 3, a reference voltage source 6 which is variable, a control circuit 7 for controlling the load current, and an amplifier 8 for imparting a control signal to said control circuit 7, said control signal being related to the difference between the voltage across said current detecting resistor 5 and the voltage of said reference voltage source 6.

The electric current supplied from the power source 4 to the load 3 is detected as a voltage drop across the current detecting resistor 5. The control circuit 7 controls the load current in response to the signal from the amplifier 8 so that the voltage across the current detecting resistor 5 becomes substantially the same as the voltage of the reference voltage source 6. Thus, the load current is maintained at a constant value.

Assuming that the voltage of the reference voltage source 6 is $e$ and the resistance of the current detecting resistor 5 is R and noting the aforementioned relationship wherein the reference voltage equals substantially the voltage across resistor 5, the load current $i$ may be expressed by the following formula:

$$i = e/R \qquad (1)$$

Therefore, if $e$ and R are not varied, $i$ remains constant. The power consumed in the resistor 5 may be expressed by the following formula:

$$W = i^2 R \qquad (2)$$

Now, if $e$ is subtsantially changed to set the load current at another rated value and $i$ is accordingly changed, W will change in proportion to $i^2$. The change of W causes a change in the temperature of the current detecting resistor 5, which in turn changes the resistance of said resistor 5, ultimately resulting in a drift of the load current $i$.

The auxiliary regulated power supply system 2 comprises a second resistor 9 thermally coupled closely with the current detecting resistor 5, an unregulated power source 10 for supplying an electric current to said second resistor 9, circuits 11 and 12 for making square values of the voltages across the current detecting resistor 5 and the second resistor 9, respectively, a reference voltage source 13, a circuit 14 for comparing the sum of said squared values with the voltage of said reference voltage source 13, and a circuit 15 for controlling the current supplied to said second resistor 9.

If the current flowing through said second resistor 9 is controlled by the control circuit 15 so that the sum of the above-mentioned squared values from the square circuits 11 and 12 is maintained at a substantially constant value, the following relation holds:

$$a_1(iR)^2 + a_2(i_a R_a)^2 = A \text{ (a constant value)} \qquad (3)$$

where $R_a$ indicates the resistance of the second resistor 9, $i_a$ the current flowing through said second resistor 9, and $a_1$ and $a_2$ coefficients related to the square circuits 11 and 12, respectively. Transforming the Formula 3:

$$i_a^2 = \frac{1}{a_2 R_a^2}(A - a_1(iR)^2) \qquad (4)$$

The sum of the power $W_T$ consumed in the current detecting resistor 5 and the second resistor 9 is determined by the following formula:

$$W_T = i^2 R + i_a^2 R_a \qquad (5)$$

From the Formulas 5 and 5, $$W_T = \frac{A}{a_2 R_a} + R\left(1 - \frac{a_1 R}{a_2 R_a}\right) i^2 \qquad (6)$$

Therefore, if $a_1 R = a_2 R_a$, then $W_T$ assumes a constant value regardless of $i$. In other words, if the temperature of the current detecting resistor 5 tends to vary as a result of a substantial change of $e$ and accordingly of $i$, the heat for compensating said variation of the temperature is generated from the second resistor 9 which can be thought of as thermally united with the current detecting resistor 5, and thereby the temperature of said current detecting resistor is kept constant.

As described above, since $W_T$ is maintained at a fixed value regardless of $i$, said drift of $i$ is effectively avoided even if $i$ is substantially changed as a result of switching the reference voltage $e$ to another rating.

The above-mentioned close thermal coupling of the current detecting resistor 5 and the second resistor 6 can be attained by either of several known techniques. For example, such a combination of resistors may be obtained by winding two insulated electro-resistive wires around a bobbin, the material, diameter and number of turns of the respective windings being selected so that said two windings appropriately correspond to said two resistors 5 and 9 respectively. Alternatively, two electro-resistive layers corresponding to said two resistors 5 and 9 may be vapour-deposited on the surface of a bobbin or a plate with a vapour-deposited insulating layer between them, the resistance and current bearing capacity of each layer being obtained as desired by appropriately selecting the material, thickness and size of each layer.

The component units or circuits shown in the figure may be of any known types of such units or circuits. Therefore, detailed explanation or illustration of such units or circuits is omitted.

Although the invention has been described in connection with a regulated power supply, it will be appreciated that the fundamental concept of the present invention may be applied to any electrical circuit element such as a resistor or an inductor in any electrical circuit where the drift in the value of the circuit element due to the temperature variations should be avoided by all means, such as in an electrical measurement circuit or an electrical control circuit.

Furthermore, according to the invention it will be apparent that variation in the ambient temperature can be easily compensated by adjusting the value of the reference voltage source 13 by employment of an ambient temperature sensing resistor so that the sum of the power consumed in the resistor and the auxiliary resistor may be inversely controlled in accordance with variation of the ambient temperature.

It will be understood that though this invention has been described with reference to the attached drawing, the system shown in the drawing is only an embodiment of this invention and should not be considered to limit the scope of this invention to it.

What is claimed is:

1. In a regulated power supply which includes a power source for supplying an electric current to a load, a first electric element for detecting said load current, and a first means for controlling said load current in response to the detection of said first electric element so as to maintain said load current at a substantially constant value, the improvement comprises, in combination, a second electric element which is thermally coupled closely with said first electric element, an auxiliary power source for supplying an electric current to said second electric element, and a second means for controlling said current to said second electric element so that the sum of the power consumed in said first and second electric elements is substantially constant.

2. A regulated power supply as defined in claim 1, wherein said first means for controlling the load current comprises means for providing a reference voltage and means for regulating said load current so that the voltage corresponding to said load current detected by said first electric element becomes substantially the same as said reference voltage.

3. A regulated power supply as defined in claim 2, wherein said means for providing the reference voltage is a variable source.

4. A regulated power supply as defined in claim 1, wherein said second current controlling means comprises means for making squares of values respectively corresponding to the currents flowing through said first and second electric elements, and means for regulating said current flowing through said second electric element so that the sum of said two squared values is maintained substantially at a constant value.

5. A regulated power supply as defined in claim 1, wherein said first and second electric elements are resistors respectively.

6. A regulated power supply as defined in claim 4, wherein said first and second electric elements are resistors respectively.

7. A regulated power supply as defined in claim 6, wherein said means for providing the reference voltage is a variable voltage source.

References Cited
UNITED STATES PATENTS

| | | | |
|---|---|---|---|
| 2,932,714 | 4/1960 | Merrill | 323—68X |
| 3,119,060 | 1/1964 | Spector | 323—68X |

J D MILLER, Primary Examiner

G. GOLDBERG, Assistant Examiner

U.S. Cl. X.R.

307—51, 60; 323—20, 68